Aug. 21, 1962 R. L. SCOTT 3,050,372
MEANS AND METHOD FOR CARBON AND HYDROGEN ANALYSIS
Filed Nov. 3, 1958 4 Sheets-Sheet 1

INVENTOR.
R. L. SCOTT

BY Hudson & Young

ATTORNEYS

Aug. 21, 1962 R. L. SCOTT 3,050,372
MEANS AND METHOD FOR CARBON AND HYDROGEN ANALYSIS
Filed Nov. 3, 1958 4 Sheets-Sheet 3

INVENTOR.
R. L. SCOTT
BY Hudson & Young
ATTORNEYS

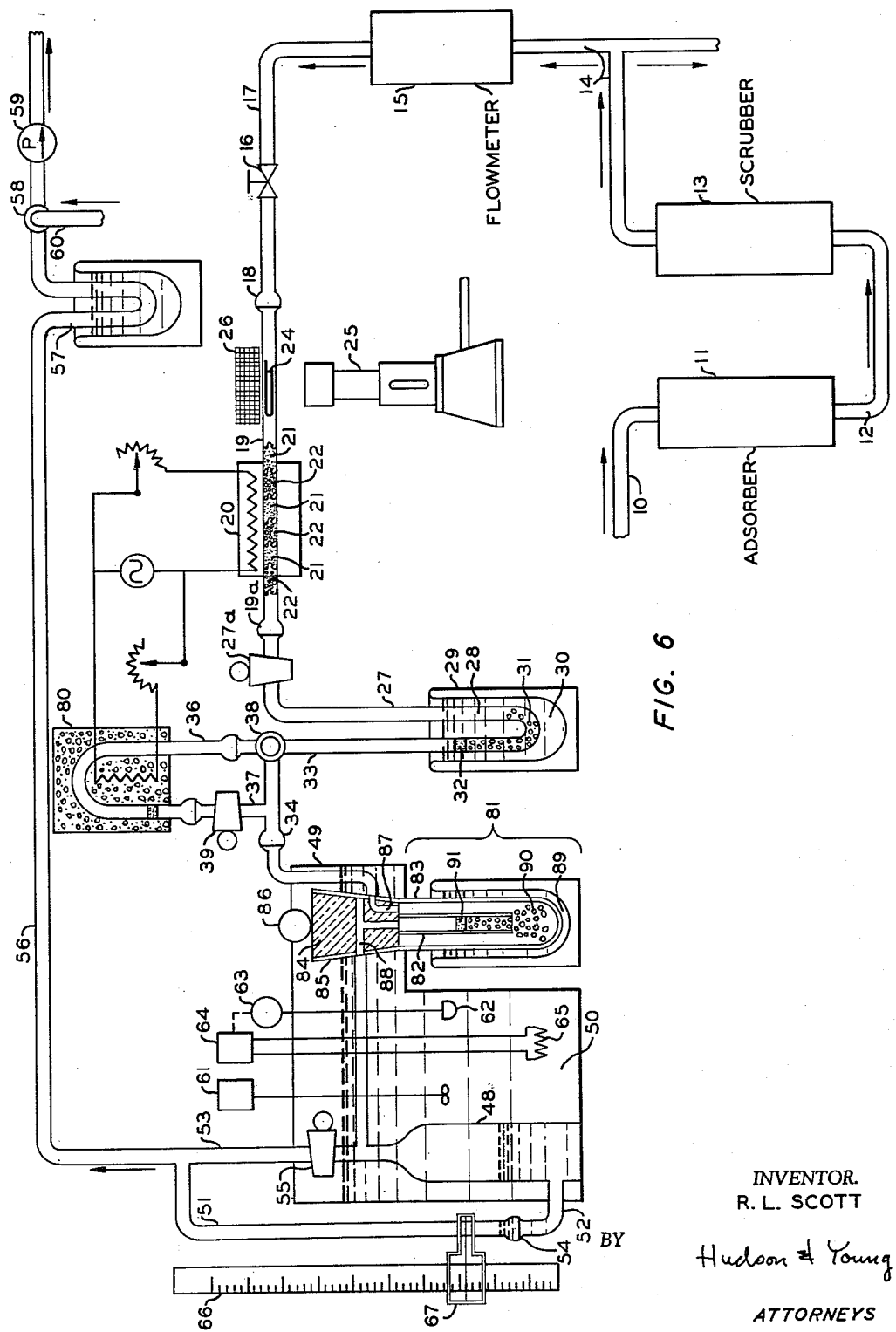

United States Patent Office 3,050,372
Patented Aug. 21, 1962

3,050,372
MEANS AND METHOD FOR CARBON AND
HYDROGEN ANALYSIS
Richard L. Scott, Bartlesville, Okla., assignor to Phillips
Petroleum Company, a corporation of Delaware
Filed Nov. 3, 1958, Ser. No. 771,665
15 Claims. (Cl. 23—230)

This invention relates to the analysis of substances for hydrogen and carbon contents. In one aspect, this invention relates to a method for determining the carbon and hydrogen present in a substance. In another aspect, this invention relates to an apparatus for determining the carbon and hydrogen present in a substance. In another aspect, this invention relates to sample containers for substances to be analyzed.

It is frequently necessary or desirable to know the carbon and hydrogen contents of particular hydrocarbon streams and organic compounds. Most of the analytical methods and apparatus currently employed for making such analyses are inaccurate, time consuming, and must generally be performed in well-equipped laboratories. For example, the semimicro gravimetric method of analysis has been used for many years; however, this method of analysis requires an expensive and sensitive micro balance located in a temperature and humidity controlled room in order to obtain accurate results. Also, there are many inherent difficulties encountered in weighing the adsorbers employed in this method so that the analyses require a large period of time.

Although the water and carbon dioxide obtained from the combustion of a sample have been measured manometrically in order to obtain the carbon and hydrogen contents, the systems heretofore devised have been unstable and inaccurate in the results obtained. Also, the systems heretofore devised employing a manometric method of analysis have been inaccurate due to changes in ambient temperature which cause variations in the observed pressures of carbon dioxide and water. Furthermore, wide differences in carbon and hydrogen contents of the sample have resulted in manometer readings for one of the constituents which are either too large or too small to be read accurately.

An object of this invention is to provide a method and an apparatus for rapidly determining the carbon and hydrogen contents of a substance by a manometric means.

Another object of this invention is to provide a manometric method of analysis for carbon and hydrogen which is not greatly affected by variations in ambient temperatures.

Another object of this invention is to provide an apparatus for determining carbon and hydrogen contents manometrically with a very high degree of accuracy.

Another object of this invention is to provide a method and means for obtaining optimum manometer readings in a manometric method of analysis for carbon and hydrogen.

Another object of this invention is to provide a manometric method of analysis wherein the observed pressures of water and carbon dioxide formed by pyrolysis of the sample are readily converted to weights of carbon and hydrogen by reference to suitable graphs.

Other objects and advantages of this invention will be apparent to one skilled in the art upon studying this disclosure and the attached drawings.

FIGURE 6 is a diagrammatic illustration of a second embodiment of this invention.

Figure 1:
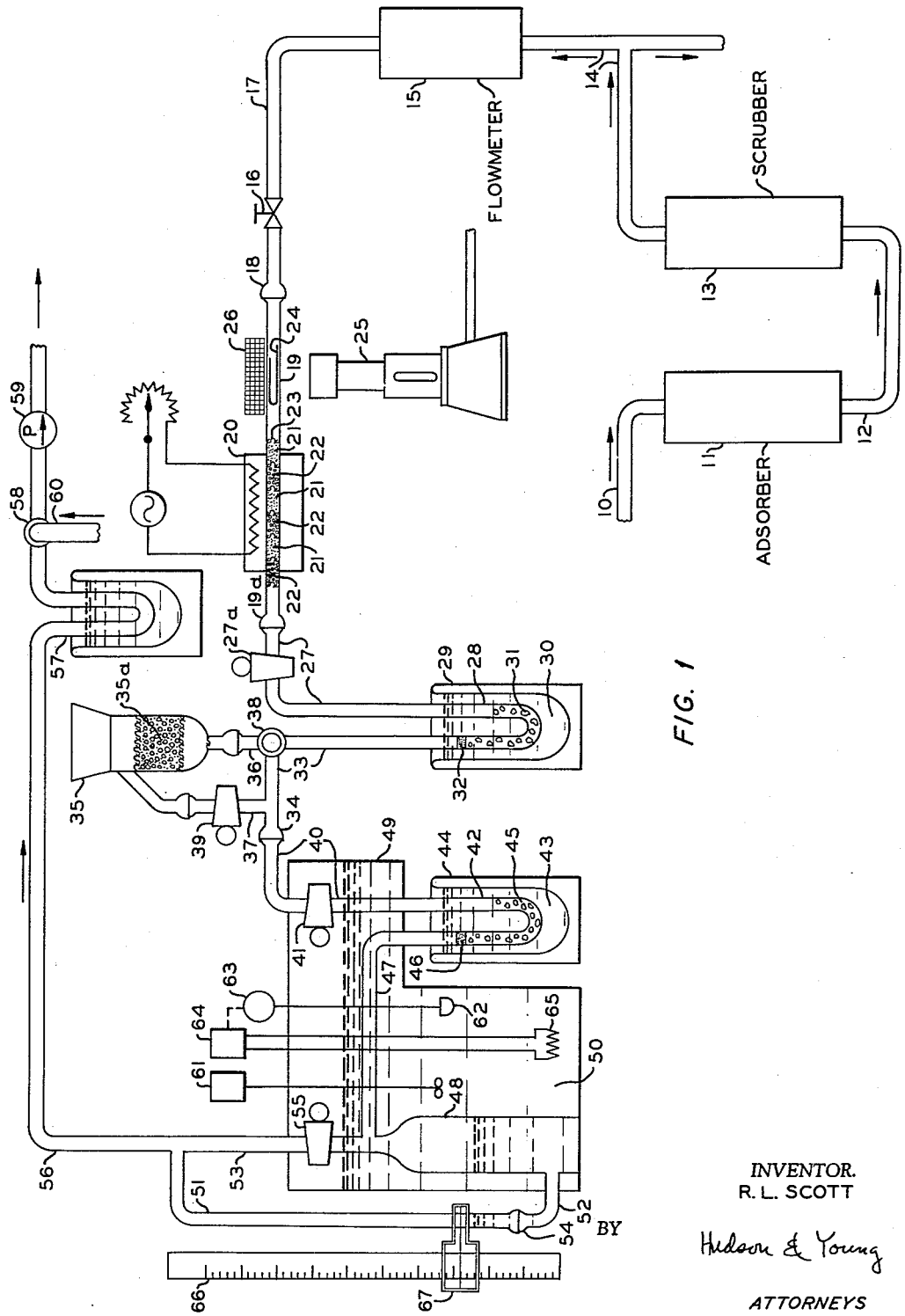
FIGURE 1 is a diagrammatic illustration of a first embodiment of this invention.

In the practice of this invention, a sample of known weight is subjected to pyrolysis and the carbon dioxide and water produced and collected as solid particles in a trap means subjected to a regulated temperature whereby the carbon dioxide and water are selectively vaporized into an evacuated manometer maintained at a constant elevated temperature. The observed pressure of each component is referred to a calibration curve for each component to determine the weight of carbon and hydrogen present in the sample. The oxygen used in the pyrolysis step is subjected to purification to remove substantially all impurities, including carbon dioxide, water, organic compounds, and sulfur compounds therefrom. Nitrogen oxides formed in the pyrolysis of nitrogen containing organic compounds are reduced to nitrogen which does not interfere with the measurement of carbon dioxide and hydrogen pressures.

According to this invention, the manometer employed to measure carbon dioxide and water is maintained at a constant elevated temperature, preferably in the range of 60° C. to 100° C. by arrangement of the mercury reservoir of the manometer means in a constant temperature bath maintained constant to ±0.02° C. Also, the conduit means between the trap means wherein the carbon dioxide and water are collected as solid particles and the manometer means is maintained at the same constant elevated temperature. Use of the constant temperature prevents variations in the observed pressures of carbon dioxide and water caused by changes in the ambient temperature. Use of the elevated temperature reduces the condensation of water vapor in the manometer and conduit means associated therewith and multiplies the maximum scale height for water vapor so that the selection of a sample size can be made with regard to optimum reading for carbon dioxide without concern that more water will be produced than can be measured.

In the apparatus of this invention the loss of solid particles of carbon dioxide and water from the trap means by the flow of oxygen therethrough is prevented by the incorporation of a flow restriction subjected to the controlled temperature maintained around the trap means and incorporated in one arm of the trap means. Preferably, fritted glass discs are used as the flow restriction means. Glass wool is not suitable for this purpose since water vapor is retained therein and an inaccurate hydrogen determination results.

As a special feature of this invention, there is provided a sample container for the introduction of liquid samples, particularly those which are readily volatile, for weighing and then for holding the sample in the carbon-hydrogen analyzer for the determination of these components. In general, this sample container comprises a generally U-shaped capillary tube, preferably constructed of quartz, closed at one end and having a small capillary opening at the other end. The arm of the tube having the capillary opening is filled with a solid adsorbent, preferably alumina. The sample container is filled by inserting the arm of the tube with the capillary opening into the liquid sample and by applying heat to the arm of the tube having the sealed end to thereby produce a low pressure within the tube when the heat is removed from the sealed arm so that liquid sample is withdrawn within the tube. In use in the carbon-hydrogen analyzer, this sample container is readily broken at the U-bend in the tube so that the sample contained therein can be vaporized by the application of heat.

Referring to FIGURE 1 of the drawings, an oxygen stream, such as commercially available oxygen, is passed through conduit 10 to adsorber 11 for the removal of any organic impurities which might be present in the oxygen stream. Adsorber 11 contains cupric oxide particles of 20 to 40 mesh size and is heated to a temperature in the range of from 500° to 600° C., usually 550° C. Adsorber 11 can be a commercially available micro preheater such as a preheater manufactured by the Fischer Scientific Company, Catalog No. 20–225. The treated air passes through conduit 12 from adsorber 11 to scrubber 13 where carbon dioxide and water impurities are removed. Scrubber 13 is filled with a sodium-hydroxide adsorbent for the removal of carbon dioxide and magnesium perchlorate for the removal of water with the the sodium hydroxide adsorbent and the magnesium perchlorate arranged separately so that the incoming oxygen stream contacts the sodium hydroxide adsorbent first and the magnesium perchlorate last. A preferred sodium hydroxide adsorbent is sodium hydroxide on asbestos which is commercially known as Ascarite. Any hydrogen sulfide impurity in the oxygen stream is also removed in scrubber 13. The purified oxygen stream is removed from scrubber 13 through conduit 14 and the flow thereof measured in flow meter 15 which preferably is a rotameter such as a rotameter manufactured by the Fischer Scientific Company, Catalog No. 11–163, equipped with a tube, Catalog No. 08–130/15, and a steel ball float. The flow of oxygen through conduit 14 is regulated by valve 16 in conduit 17 terminating in detachable joint 18.

Pyrolysis of the sample is conducted within combustion tube 19 which is disposed within combustion furnace 20 with each end projecting outside furnace 20. Combustion tube 19 is preferably constructed of either quartz or Vycor and terminates in detachable joint 18 at one end and detachable joint 19a at the other end. Combustion furnace 20 is any readily available furnace which is capable of maintaining a temperature in the range of 800° to 900° C. and is preferably an electric furnace. Combustion tube 19 is packed with alternate zones of catalytic material 21 and reactive material 22 for a distance corresponding to the length of the furnace 20. Catalytic material 21 oxidizes organic matter to carbon dioxide and water and is preferably cupric oxide of a 20 to 40 mesh size. Reactive material 22 reacts with chlorine and sulfur and is preferably silver of 20 mesh size. Platinum gauze 23 of 100 mesh is used to separate copper oxide zones 21 from silver zones 22. The sample for which the carbon and hydrogen content is to be determined is placed within sample container 24 which is disposed within combustion tube 19 at a point outside furnace 20 on the oxygen inlet side thereof. The sample is vaporized with initiation of pyrolysis by the application of heat to combustion tube 19 from laboratory burner 25. Nichrome gauze 26 located above combustion tube 19 adjacent burner 25 serves to reflect heat onto the upper side of combustion tube 19 and prevent localized overheating.

The vapor products formed in furnace 20 pass from the end of combustion tube 19 through conduit 27, connected to combustion tube 19 by detachable joint 19a and stopcock 27a into trap 28 comprising a U-shaped tube subjected to controlled temperature. Preferably, the temperature is controlled by the insertion of the U-tube into a vacuum flask 29 containing a refrigerant to produce a sufficiently low temperature to freeze the water in the vapor products without freezing the other components. Refrigerating bath 30 in flask 29 can be any bath sufficient to obtain a temperature below the freezing point of water but above the boiling point of carbon dioxide and nitrogen compounds; i.e., a temperature of −78° C. A mixture of acetone and Dry Ice or Stoddard solvent, which is straight run gasoline boiling in the range of 300° to 400° F., and Dry Ice are very suitable refrigerating baths. The solid particles of water 31 formed in trap means 28 are prevented from flowing therefrom by flow restriction 32 located in one arm of the U-tube. Preferably, flow restriction 32 is a fritted glass disc and is located below the upper level of refrigerating bath 30. The vapor products not condensed in trap means 28 are discharged therefrom through conduit 33 terminating in detachable joint 34. If desired, the vapor products from trap means 28 can be passed through nitrogen oxides scrubber 35 by way of conduit 36 and conduit 37 through adjustment of three-way valve 38 and valve 39. Preferably, nitrogen oxides scrubber 35 is filled with manganese dioxide 35a which reduces any nitrogen oxides to molecular nitrogen and removes any sulfur oxides which might be present in the vapor products.

Nitrogen oxides scrubber 35 is always used when the sample being analyzed is a nitrogen-containing compound and is often used in all analyses in order to assure that no nitrogen oxides pass further into the system to cause inaccurate determinations. If nitrogen oxides scrubber 35 is not used, three-way stopcock 38 is adjusted so that all the vapor products from trap means 28 pass through conduit 33. Also, when nitrogen oxides scrubber 35 is not used, refrigerating bath 30 can be removed from trap means 28 so that all the vapor products, including water, pass therethrough without any vapor products being retained therein. However, if nitrogen oxides scrubber 35 is used, the water in the vapor products must be retained in trap means 28 since the manganese dioxide in scrubber 35 will also remove water from the vapor products stream. After all of the nitrogen oxides have been removed from the vapor products stream, with the water being held in trap means 28, three-way stopcock 38 is adjusted and stopcock 39 is closed so that the solid water held in trap means 28 can be vaporized by removal of refrigerating bath 30 and passed through conduit 33. The operation of the apparatus is more completely described below.

The vapor products, comprising water and carbon dioxide either separately or in admixture, pass from conduit 33 through conduit 40 and stopcock 41 into trap means 42 comprising a U-shaped tube subjected to controlled temperature obtained by immersion of the U-shaped tube into refrigerating bath 43 contained within vacuum flask 44. Refrigerating bath 43 produces a temperature sufficiently low to freeze carbon dioxide and water to form solid particles 45 which are retained within the U-shaped tube by flow restriction 46. As will be explained in the operation of the apparatus, the U-shaped tube is also subjected to other temperatures in order to vaporize the solid particles of carbon dioxide and water either separately or selectively if the two are in admixture. Thus, refrigerating bath 43 is changed from time to time to a bath which is capable of attaining a temperature below the freezing point of water but above the boiling point of carbon dioxide. Further, refrigerating bath 43 is at other times replaced with a bath sufficient to obtain a temperature sufficient to melt the solid particles of water and vaporize the same. The refrigerating bath sufficient to freeze both carbon dioxide and water can be any readily available mixture and is preferably liquid nitrogen which produces a temperature of approximately −195° C. The refrigerating bath producing a temperature above the boiling point of carbon dioxide but below the freezing point of water can be any readily available suitable material such as a mixture of acetone and Dry Ice or a mixture of Stoddard solvent and Dry Ice. The bath used for vaporizing the water is preferably boiling water.

Flow restriction 46 located within the U-tube at a point below the upper level of bath 43 prevents the passage of solid particles of carbon dioxide and water from trap means 42. Preferably, flow restriction 46 is a porous fritted glass disc. Glass wool is not suitable for this purpose since moisture is adsorbed therein resulting in an inaccurate determination of hydrogen.

The other arm of the U-tube is connected by conduit 47 with mercury reservoir 48 which is arranged within a compartment 49 of a constant temperature bath 50 with conduit 47 immersed within constant temperature bath 50. Conduit 40 and the upper parts of the arms of the U-tube are also immersed within constant temperature bath 50 with the U-tube extending below compartment 49 with refrigerating bath 43. Manometer leg 51 is connected through conduit 52 to the bottom of mercury reservoir 48. The top end of manometer arm 51 is connected to the other side of mercury reservoir 48 by means of conduit 53. Conduit 52 projects through the wall of temperature bath 50 and terminates in ball and socket joint 54 for receiving the lower end of manometer arm 51. Stopcock 55 in conduit 53 between the juncture of manometer arm 51 with conduit 53 and the juncture of conduit 53 with conduit 47 can be adjusted to permit the complete evacuation of the system, including combustion tube 19. Constant temperature bath 50 is ordinarily filled with a heat exchange fluid to obtain a level which is just below stopcocks 43 and 55. The heat exchange fluid is preferably mineral oil; however, any fluid which is not excessively volatile at temperatures in the range of from 60 to 100 F. can be used.

Conduit 53 is connected through conduit 56, trap means 57, and three-way stopcock 38 to vacuum pump 59. Conduit 60 attached to stopcock 58 is open to the atmosphere. Vacuum pump 59 can be any readily available device which can obtain substantially constant low pressure, preferably a pressure in the range of 1 micron.

The heat exchange fluid in temperature bath 50 is circulated by mixer 61. The temperature of the heat exchange fluid is detected by temperature element 62 connected to temperature regulator 63 which adjusts the supply of heat from heat supply 64 to heater 65 located within the heat exchange fluid. Preferably, heater 65 is an electric type immersion heater. Temperature regulator 63 is any commercially available instrument which can maintain the temperature of the heat exchange fluid constant within ±0.02° C.

The level of mercury in manometer arm 51 is determined by reading scale 66 of cathetometer 67.

Figure 2:
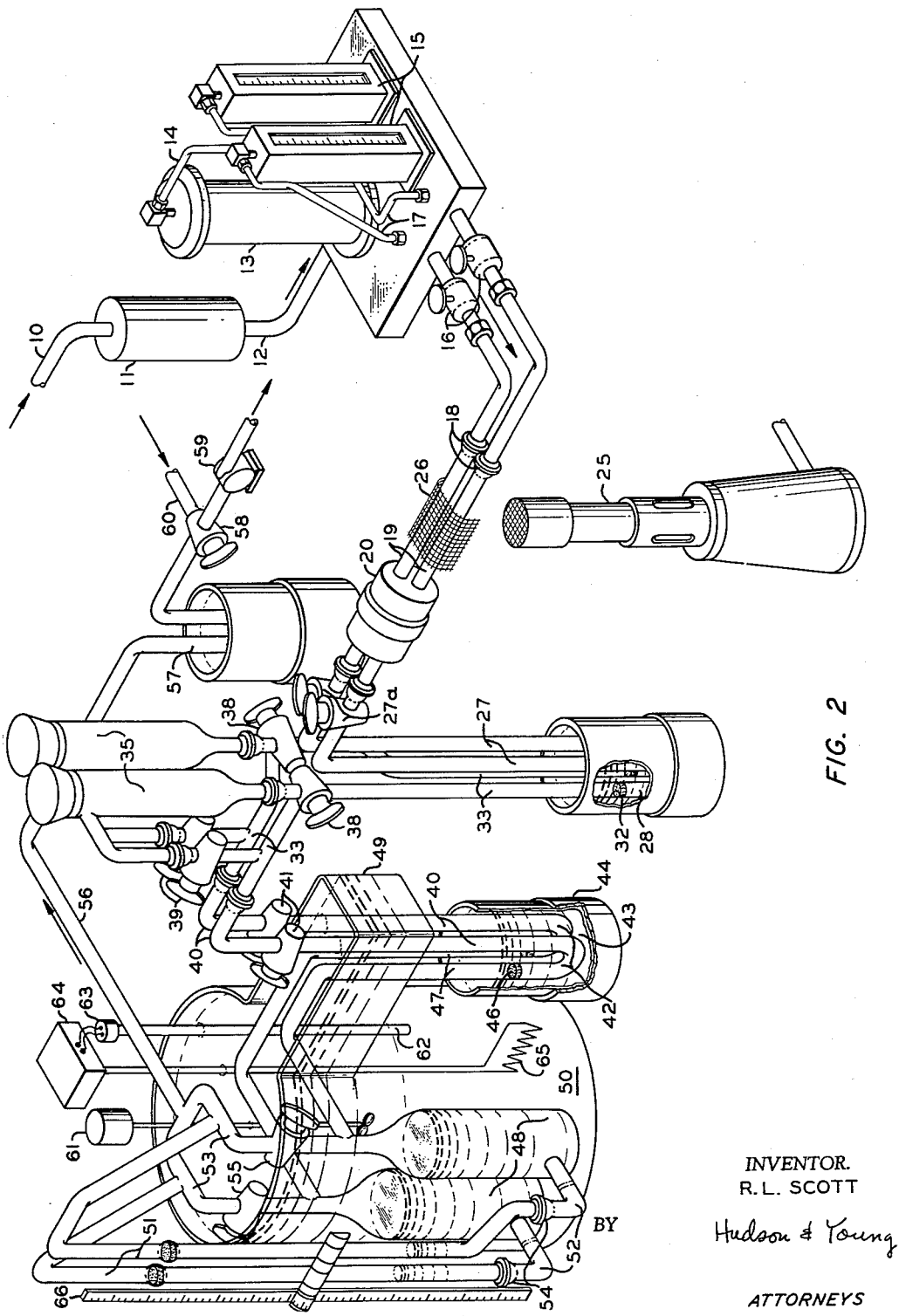
FIGURE 2 is an isometric drawing of the apparatus of FIGURE 1 showing an arrangement of the elements of the apparatus.

The arrangement of the various elements of the apparatus shown in FIGURE 1 is described in the isometric drawing of FIGURE 2.

In operation of the apparatus, the system must first be conditioned and manometer 51 calibrated before determinations of carbon and hydrogen can be made. The system is conditioned by opening valve 16 and stopcocks 27a, 38, 41 and 55 to provide a path of flow through conduits 19, 27, 33, 40, 47, 53 and 56 for the flow of oxygen through the system. Oxygen, under a pressure of 2 p.s.i.g., is passed through the system with valve 16 adjusted to give a rotameter reading of from 6 to 7 and the flow of oxygen continued over-night. Combustion furnace 20 is adjusted to give a temperature of from 800° C. to 850° C. After sweeping out the system over-night, a 10 milligram sample of benzoic acid is placed in sample container 24 which is inserted into combustion tube 19 through detachable joint 18. The benzoic acid is subjected to pyrolysis by the application of heat from burner 25 and the vapor products condensed in trap means 42 using liquid nitrogen as the refrigerant bath 43.

The system is calibrated by the pyrolysis of a series of accurately weighed samples of National Bureau of Standards benzoic acid in accordance with the procedure to be described hereinafter to obtain manometer readings for both carbon dioxide and water on manometer 51. For each sample, the ratio of carbon weight to the observed pressure of carbon dioxide and the ratio of hydrogen weight to the observed water pressure are calculated. These calculated values are plotted as ordinates on separate graphs against the corresponding carbon dioxide and water pressures observed as abscissas to obtain the graphs shown in FIGURES 4 and 5. By the use of these calibration curves, the observed pressures for water and carbon dioxide obtained from an unknown sample can be readily converted to the weights of carbon and hydrogen by reading the calibration curves shown in FIGURES 4 and 5 to find the correct weight-pressure ratios corresponding to the observed pressures and multiplying the ratios obtained by the pressures observed.

In the determination of carbon and hydrogen in an unknown sample, the sample is accurately weighed to ±0.01 milligram in sample container 24 and inserted into combustion tube 19 through detachable joint 18 to locate sample container 24 approximately 4 inches from furnace 20. Air valve 16 is closed and the complete system is evacuated by pump 59 with stopcock 58 closed to the atmosphere. The temperature of constant temperature bath 50 is adjusted to a temperature of 62° C. ± 0.02° C. Trap means 28 is filled with a mixture of Dry Ice and acetone and trap means 42 is filled with a refrigerating bath of liquid nitrogen. Trap means 57 is also filled with liquid nitrogen. With the evacuation of the system by vacuum pump 59 continuing, air valve 16 is opened to provide an oxygen flow reading of from 6 to 7 on rotameter 15.

The pyrolysis of the sample is started by bringing burner 25 into contact with combustion tube 19 at a point approximately 3 inches upstream from the location of sample container 24. Burner 25 is slowly moved toward the furnace over a period of from 15 to 20 minutes to vaporize the sample. Thereafter, the oxygen flow is increased to a reading of 8 or 9 on rotameter 15 and gas burner 25 is again moved from in front of sample container 24 toward furnace 20 over a period of from 5 to 10 minutes. The sample is vaporized with some pyrolysis taking place and the components formed are swept by the flow of oxygen into furnace 20 maintained at a temperature of approximately 850° C. where the organic material is converted into carbon dioxide and water by the cupric oxide 21 and any chlorides and sulfides formed are removed by silver 22. The vapor products produced will comprise carbon dioxide and water when the sample is nitrogen free and carbon dioxide, water and nitrogen oxides when the sample contains nitrogen compounds.

The vapor products are swept into trap means 28 by the flow of oxygen and the water therein is condensed and separated out as solid particles which are retained within trap means 28. Stopcock 38 is adjusted so that the remaining vapor products pass through nitrogen oxides scrubber 35 where any nitrogen oxides are reduced to molecular nitrogen and any sulfide impurities remaining are removed from the stream. From scrubber 35, the carbon dioxide vapor and any molecular nitrogen present pass into trap means 42 having the U-shaped tube immersed in liquid nitrogen. The carbon dioxide is condensed and separates out as solid particles of carbon dioxide which are retained within trap means 42 by flow restriction 46. At this point, air valve 16 is closed and the operation of vacuum pump 59 is continued until the system is evacuated to a steady low pressure. Then the level of the mercury in manometer 51 is read with stopcock 55 closed.

The carbon dioxide pressure is determined by vaporizing the solid particles of carbon dioxide retained in trap means 42. The Dry Ice can be vaporized by removing the liquid nitrogen bath 43 from around the U-tube and immersing the U-tube in water until the ice formed therearound just melts. Then, the water is wiped up from around the U-shaped tube and immersed in a Stoddard solvent-Dry Ice slurry which is removed periodically to speed the vaporization. The use of the Stoddard solvent-Dry Ice slurry is not required and the vaporization can be effected merely from the heat present in the room. When the mercury ceases to rise in manometer arm 51, the level of mercury is read to the nearest 0.001 centimeter. The weight of carbon is obtained by reference to FIGURE 4 as above described.

The carbon dioxide is removed from the system by opening stopcock 55 so that vacuum pump 59 can completely evacuate the system. When a constant low pressure has been obtained, the level of mercury in manometer arm 51 is read and the apparatus is in condition for reading the water pressure. Stopcock 38 is adjusted so that the path of flow through nitrogen oxides scrubber 35 is closed and the path of flow from trap means 28 is through conduit 33 into conduit 40. With stopcock 55 closed, refrigerating bath 30 is removed from trap means 28 and vacuum flask 29 is filled with boiling water. The maximum deflection of the mercury in manometer arm 51 is quickly read to obtain the pressure of water before the water has had an opportunity to condense in the system. In this determination of the pressure of water, vacuum flask 44 is removed from around the U-shaped tube so that trap means 42 is at least at room temperature. If there is a tendency for water to condense in trap means 42, the U-shaped tube can be immersed in boiling water. Also, conduits 33 and 40 can be wrapped with an electric heating tape and heated in order to reduce the condensation of water therein. The hydrogen content of the sample is obtained in the manner described above by reference to the calibration curve shown in FIGURE 5.

As an alternate method of operation, the carbon dioxide and the water can be collected together in trap means 42 after the passage of the carbon dioxide vapor through nitrogen oxides scrubber 35. In this operation, the water is still retained in trap means 28 while the carbon dioxide is passed through nitrogen oxides scrubber 35 and collected in trap means 42 using liquid nitrogen as the refrigerating bath. Then, stopcock 38 is adjusted so that the water, which is vaporized by removing refrigerating bath 30 from trap means 28, passes through conduit 33 into trap means 42 where the water is also separated out as solid particles. The carbon dioxide is selectively vaporized without vaporization of the water by changing the liquid nitrogen bath 43 to a Stoddard solvent-Dry Ice bath which has a temperature below the freezing point of water but above the boiling point of carbon dioxide. After the pressure of the carbon dioxide is read on manometer 51 and the carbon dioxide has been removed from the system by vacuum pump 59, the pressure of the water is determined by vaporizing the solid particles of water in trap means 41 through the replacement of the Stoddard solvent-Dry Ice slurry with a bath of boiling water. In this operation of the apparatus, there is less opportunity for the condensing of water in the system so that a more accurate determination of hydrogen can be made.

If desired, where the sample being analyzed is free of nitrogen, the refrigerating bath 30 need not be used with trap means 28 and the carbon dioxide and water vapors are passed directly into trap means 42 through conduit 33 bypassing nitrogen oxides scrubber 35. However, where the highest possible accuracy in the determination is desired, nitrogen oxides scrubber 35 and trap means 28 are used in order to avoid errors due to any small amounts of nitrogen oxides or sulfide compounds.

Referring to FIGURE 2 of the drawings, the elements of the apparatus of FIGURE 1 are arranged in parallel so that two hydrogen and carbon determinations can be run simultaneously, thereby greatly increasing the number of analyses which can be made in any given period of time.

Figure 3:
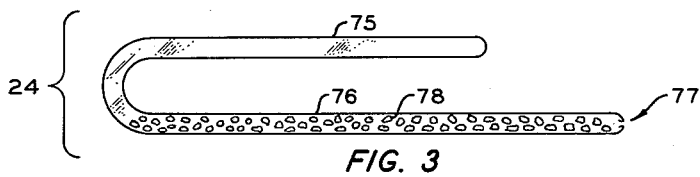
FIGURE 3 is a longitudinal sectional view of a sampler container for use in the invention.

Referring to FIGURE 3 of the drawings, there is shown a sample container of novel design for use in the apparatus of this invention for making carbon and hydrogen determinations of liquid samples, particularly samples exhibiting relatively high volatility. This sample container is constructed in U-shape with one arm 75 having a closed end and a second arm 76 having a small capillary opening 77 in the end thereof. Arm 76 is filled with an adsorbent 78, preferably alumina, although silica can also be used. For use in the apparatus shown in FIGURES 1 and 2 of the drawings, this sample container is ordinarily constructed to have a length between 1.5 and 2 inches with arms 75 and 76 separated sufficiently for inverting the sample container over the edge of a beaker or other container with arm 76 immersed in the sample and arm 75 hanging outside the beaker. The sample container is filled by directing heat against arm 75 to force the air within the container out through a capillary opening 77 and thereby permit sample to be drawn into the container upon cooling.

The sample container of FIGURE 3 can be readily weighed on a micro balance since the capillary opening 77 acts as an effective seal for the usual period of weighing. Also, the adsorbent disposed within the container serves to reduce the vaporization of the sample at room temperature.

In use, the sample container of FIGURE 3 is inserted into combustion tube 19 and broken in the area of the bend between arms 75 and 76 by applying pressure by means of a glass rod or other device to either arm 75 or arm 76 or to both of them. With the application of heat to combustion tube 19, the sample is vaporized and evolved from the adsorbent very slowly with very little flashing occurring in the pyrolysis step. Any of the sample decomposing on the adsorbent is easily burned off and passes through the system in the normal manner.

Referring to FIGURE 6 of the drawings, wherein similar elements in FIGURE 1 are identified with the same reference number, there is shown another embodiment of the invention. Nitrogen oxide scrubber 80 in the embodiment in FIGURE 6 is filled with copper oxide of 20 to 40 mesh size. The copper oxide is reduced to metallic copper by the introduction of hydrogen into scrubber 80 with the application of a low temperature flame.

The U-shaped tube trap means 42 of FIGURE 1 is replaced in FIGURE 6 with a concentric tube trap means 81 comprising concentric tubes 82 and 83 sealed to plug 84 and sleeve 85, respectively, of stopcock 86. Outer tube 83 is closed at its lower end whereas inner tube 82 is open. Communication between conduit 40 and the annular space between tubes 82 and 83 is provided by bore 87 in plug 84 through sleeve 85. An outlet from tube 82 is provided by T-shaped bore 88 in plug 84 and sleeve 85. Conduit 47 is connected to sleeve 85 in open communication with tube 82 through bore 88. Thus, as shown in FIGURE 6, the path of flow is from conduit 40 through bore 87 through the annulus between tubes 82 and 83 out tube 83 through bore 88 into conduit 47. When plug 84 is rotated so that the other arm of bore 88 is in open communication with conduit 47, there is no communication between conduit 40 and the annulus between tubes 82 and 83 so that the only open communication with tubes 82 and 83 is between tube 82 and conduit 47 through bore 88. Tubes 82 and 83 are inserted into a refrigerating bath 89 contained within vacuum flask 90 for producing a controlled temperature. Flow restriction 91 is located in tube 82 to prevent the passage of solid particles from trap means 81.

In the operation of the apparatus of FIGURE 6, trap means 28 is immersed in a liquid nitrogen refrigerating bath 30 in order to separate out both carbon dioxide and water. After all the carbon dioxide and water have been collected in trap means 28, air valve 16 is closed and the system is evacuated by means of pump 59 to withdraw oxygen. Upon completion of removal of oxygen, the carbon dioxide and water trapped in trap means 28, air valve 16 is closed and the system is evacuated by means of pump 59 to withdraw oxygen. Upon completion of removal of oxygen, the carbon dioxide and water trapped in trap means 28, including any nitrogen oxides which were also collected in trap means 28, are vaporized and passed through nitrogen oxide scrubber 80 filled with the reduced copper oxide and maintained at a temperature of 900° C. The reduced copper reduces the nitrogen oxides to molecular nitrogen without affecting the carbon dioxide and water present in the vapor. The trap means 81 is filled with liquid nitrogen so that the carbon dioxide and water passing from scrubber 80 are condensed and separated as solid particles. In this apparatus using reduced copper in the nitrogen oxide scrubber, trap means 28 cannot be omitted since the carbon dioxide and water must be collected and held in the system until the oxygen can be removed therefrom before passing the collected gases through the reduced copper which would otherwise be oxidized by the oxygen in the system without effecting any reduction of nitrogen oxides to molecular nitrogen.

The measurement of the carbon dioxide and water in manometer 51 is the same as in FIGURE 1 with the carbon dioxide and water being vaporized selectively by changing refrigerating bath 89 from liquid nitrogen to a mixture of dry ice and acetone and then to boiling water.

The sample container 24 used in the apparatus of FIGURE 6 can be any commercially available open container of inert material and is preferably constructed of platinum. This sample container should be approximately 16 millimeters long although other sizes, depending upon the dimensions of combustion tube 19, can be used. The sample container shown in FIGURE 3 of the drawings can also be used in the apparatus of FIGURE 6. The apparatus of FIGURE 6 can also be arranged with duplicate elements as shown in FIGURE 2 of the drawings so that duplicate samples can be run simultaneously.

Figure 4:
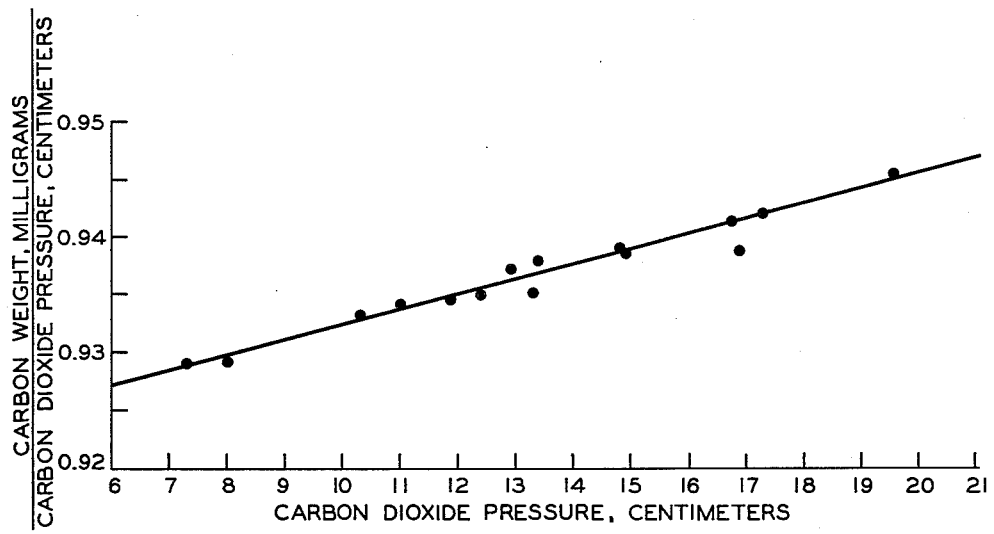
FIGURE 4 is a chart whereon the carbon dioxide pressure as determined by the method of this invention is plotted as the abscissa and the ratio of weight of carbon to carbon dioxide pressure is plotted as the ordinate.
Figure 5:
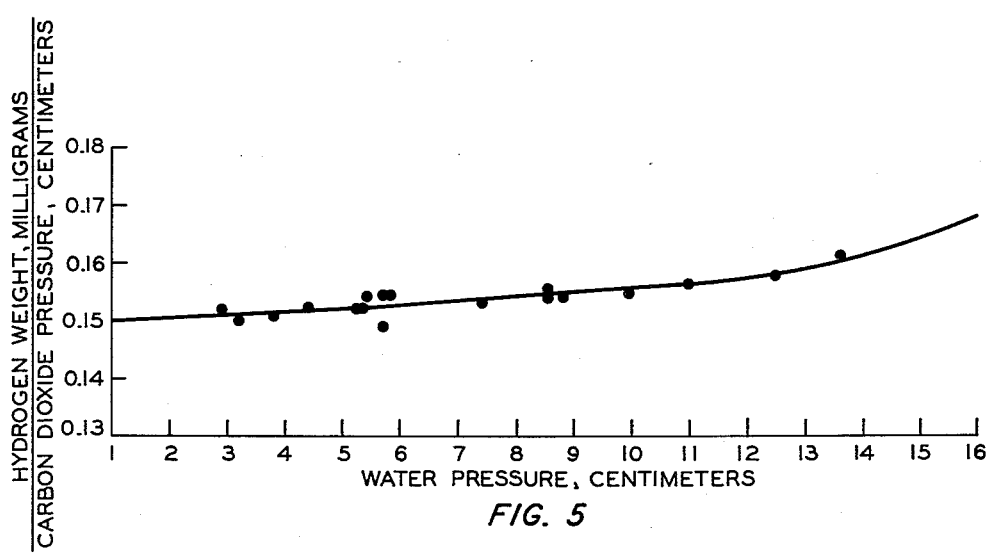
FIGURE 5 is a chart whereon the pressure of water as determined by the method of this invention is plotted as the abscissa and the ratio of weight of hydrogen to water pressure is plotted as the ordinate.

The carbon and hydrogen analysis apparatus of this invention permits carbon and hydrogen to be determined readily by oxidative pyrolysis of a sample, including nitrogen-containing samples, without weighing the carbon dioxide and water produced. The use of a constant temperature bath reduces the errors caused by variations in ambient temperature so that improved accuracy is obtained. The elevated temperature, preferably in the range of 60 to 70° C., employed in the constant temperature bath reduces the condensation of water in the system and thereby increases the accuracy of the hydrogen determination. The elevated temperature also increases the sensitivity of the manometer for the hydrogen measurement. The calibration curves as shown in FIGURES 4 and 5 of the drawings are essential to the operation of the apparatus of this invention since they permit the carbon and hydrogen to be determined more quickly and accurately than was heretofore possible.

The method and apparatus of this invention permit carbon and hydrogen to be determined with great accuracy. For example, the average deviation for carbon and hydrogen in the analysis of several different types of compounds was found to be ±0.04 percent carbon and ±0.03 percent hydrogen with maximum deviations of ±0.14 and ±0.16 percent, respectively. In comparison, the acceptable accuracy of the conventional gravimetric method is ±0.3 percent for carbon and ±0.2 percent for hydrogen. Thus, it is readily apparent that the method and apparatus of this invention give results which are a considerable improvement over the results possible with the conventional methods for determining carbon and hydrogen.

EXAMPLE

The carbon and hydrogen contents of several organic compounds were determined using the apparatus of FIGURE 1 of the drawings and the values found compared to the theoretical values for carbon and hydrogen. These data are reported in the table below with all determinations for each compound reported in order to properly evaluate the accuracy of the analysis.

*Determination of Carbon and Hydrogen With Semimicro Manometric Method*

CONSECUTIVE DETERMINATIONS

| Sample | Wt. Percent Carbon | | | Wt. Percent Hydrogen | | |
|---|---|---|---|---|---|---|
| | Theory | Found | Deviation | Theory | Found | Deviation |
| Benzoic Acid | 68.84 | 68.78 | 0.06 | 4.95 | 4.91 | 0.04 |
| | | 68.90 | 0.06 | | 4.93 | 0.02 |
| | | 68.98 | 0.14 | | 4.97 | 0.02 |
| | | 68.81 | 0.03 | | 5.03 | 0.08 |
| | | 68.83 | 0.01 | | 4.93 | 0.02 |
| | | 68.78 | 0.06 | | 4.93 | 0.02 |
| Anisic Acid | 63.18 | 63.17 | 0.01 | 5.26 | 5.28 | 0.02 |
| | | 63.15 | 0.03 | | 5.42 | 0.16 |
| | | 63.30 | 0.12 | | 5.30 | 0.04 |
| | | 63.18 | 0.00 | | 5.26 | 0.00 |
| Chlorobenzoic Acid | 53.70 | 53.69 | 0.01 | 3.22 | 3.22 | 0.00 |
| | | 53.73 | 0.03 | | 3.22 | 0.00 |
| | | 53.76 | 0.06 | | 3.22 | 0.00 |
| Trialphanaphthyl Phosphate | 75.65 | 75.65 | 0.00 | 4.41 | 4.44 | 0.03 |
| | | 75.59 | 0.06 | | 4.45 | 0.04 |
| Cystine | 29.99 | 30.06 | 0.07 | 4.99 | 5.02 | 0.03 |
| | | 29.99 | 0.00 | | 5.04 | 0.05 |
| | | 30.03 | 0.04 | | 5.02 | 0.03 |
| | | Avg. ±0.04 | | | Avg. ±0.03 | |

Reasonable variations and modifications are possible within the scope of the foregoing disclosure, drawings and the claims to the invention, the essence of which is that there have been provided first, a method for speedily and accurately determining the carbon and hydrogen content of a substance monometrically by the oxidative pyrolysis of the sample; second, an apparatus employing the above described method wherein the pressures of carbon dioxide and water vapors produced are determined in a single liquid manometer means maintained at constant elevated temperature and the observed pressures readily converted to the weight of carbon and hydrogen by reference to described calibration curves; and third, an improved sample container for volatile type samples permitting accurate weighing without loss of sample.

I claim:

1. Apparatus for determining carbon and hydrogen in a substance which comprises oxygen purification means adapted to discharge a substantially pure oxygen stream therefrom, a furnace, a combustion tube open at each end disposed within said furnace with each end projecting outside said furnace and adapted to receive said substantially pure oxygen stream through a first end thereof for pyrolysis to form vapor products containing carbon dioxide and water, a sample container containing said substance to be analyzed disposed within said combustion tube at a point outside said furnace adjacent said furnace and arranged so that the vapor products formed by pyrolysis of said substance are swept through said combustion tube disposed within said furnace, a heat exchange zone arranged for heating said sample container in said combustion tube outside said furnace, a first trap means in open communication with the second end of said combustion tube for receiving said vapor products and retaining at least a portion thereof as solid particles, said trap means having a flow restriction adapted to prevent passage of said solid particles therefrom, a first heat exchange means for maintaining said first trap means at predetermined temperature levels to condense at least a portion of said vapor products as said solids and to convert the same to vapor products when desired, a nitrogen oxides absorber means in open communication with said first trap means for removing nitrogen oxides from the vapor products recovered from said first trap means, a second trap means in open communication with said nitrogen oxide adsorber means and in open communication means with said first trap means for receiving the resulting vapor products from said nitrogen oxide adsorber means, the communication of said second trap means with said nitrogen oxide adsorber means and said first trap means being determined by a valve means, second heat exchange means for maintaining said second trap means at predetermined temperature levels to condense at least a portion of said resulting vapor products as solids and to convert the same to vapor products when desired, said second trap means having a flow restriction adapted to prevent the passage of solids particles therefrom, an evacuated mercury filled differential manometer means for determining the pressure of said carbon dioxide and said water separately, one arm of said manometer means being connected to a means for producing low pressure and the other arm of said manometer means being in open communication with said second trap means, and constant temperature bath means for maintaining said manometer means at a constant elevated temperature.

2. The apparatus of claim 1 wherein said first heat exchange means maintains said first trap means at a first temperature level to solidify only water and at a second temperature level to convert said water solids into vapor, and wherein said nitrogen oxide scrubber means contains manganese dioxide to reduce any nitrogen oxides in the water-free vapor products from said first trap means.

3. The apparatus of claim 2 wherein said second heat exchange means maintains said second trap means at a first temperature level to solidify both carbon dioxide and water, at a second temperature level to convert the carbon dioxide solids into vapor without affecting the water solids, and at a third temperature level to convert the water solids into vapor, in sequence.

4. The apparatus of claim 2 wherein said second heat exchange means maintains said second trap means at a first temperature level to solidify carbon dioxide, at a second temperature level to convert said carbon dioxide solids into vapor, at a third temperature level to solidify water, and at a fourth temperature level to convert said water solids into vapor.

5. The apparatus of claim 1 wherein said first heat exchange means maintains said first trap means at a first temperature level to solidify water, carbon dioxide and nitrogen oxides and at a second temperature level to convert said water, carbon dioxide and nitrogen solids into vapors, and wherein said nitrogen oxides scrubber means contains reduced copper oxide maintained at an elevated temperature to reduce said nitrogen oxides vapor into molecular nitrogen and wherein said second heat exchange means maintains said second trap means at a first temperature level to solidify both carbon dioxide and water, at a second temperature level to convert the carbon dioxide solids into vapor without affecting the water solids, and at a third temperature level to convert the water solids into vapor in sequence.

6. The apparatus of claim 1 wherein said first trap means comprises a U-shaped tube having an inlet means through one arm thereof and an outlet means through the other arm and wherein said second trap means comprises concentrically arranged tubes each attached to the other arm and wherein said second trap means comprises concentrically arranged tubes each attached to a valve means at one end, the inner tube being open at the other end and the outer tubing being closed at the other end, said valve means being adapted to provide flow into the annulus between the inner and the outer tubes and from the inner tube.

7. The apparatus of claim 1 wherein said first and said second trap means each comprise U-shaped tubes each having an inlet means through one arm and an outlet means through the other arm.

8. The apparatus of claim 1 wherein said flow restriction means comprises a porous fritted glass disc.

9. The apparatus of claim 1 wherein said combustion tube contains a reactive material to remove chlorides and sulfides from said vapor products and a catalytic material to oxidize organic material in said vapor products to carbon dioxide and water.

10. The apparatus of claim 9 wherein said reactive material is metallic silver and said catalytic material is cupric oxide, said silver and said cupric oxide particles being arranged within said combustion tube in a plurality of alternately disposed zones separated from each other by platinum in a porous form.

11. The apparatus of claim 1 wherein said combustion tube, said first trap means, said first heat exchange means, said nitrogen oxide scrubber means and associated valve means, said second trap means, said second heat exchange means, and said differential manometer means each comprise duplicates assembled in parallel arrangement.

12. The apparatus of claim 1 wherein said oxygen purification means comprises heat exchange means containing cupric oxide for removing organic impurities from the oxygen stream to be purified, scrubber means containing sodium hydroxide adsorbent and magnesium perchlorate in communication with said heat exchange means for removing carbon dioxide and water impurities from said oxygen stream to be purified, measuring means in open communication with said scrubber means to determine the flow of purified oxygen, and valve means associated with said measuring means to adjust said flow of purified oxygen.

13. The apparatus of claim 1 wherein sample container comprises an elongated U-shaped tube sealed at one end and having a capillary opening at the other end containing an adsorbent in the arm having the capillary opening for holding sample to be analyzed for carbon and hydrogen content.

14. A method for determining the carbon and hydrogen content of a substance comprising subjecting a weighed sample of said substance to pyrolysis in a substantially pure oxygen stream to form vapors of carbon dioxide and water, sweeping said vapors of carbon dioxide and water by continued flow of said oxygen stream into a trap means maintained at a temperature below the freezing point of carbon dioxide and water, trapping said vapors of carbon dioxide and water as a mixture of solid particles in said trap means, preventing the passage of said solid particles from said trap means, selectively vaporizing said carbon dioxide solid particles to form carbon dioxide vapor by raising the temperature of said trap means to a temperature above the boiling point of carbon dioxide but below the freezing point of water, measuring the pressure of said carbon dioxide vapor in an evacuated mercury manometer means maintained at a constant elevated temperature, removing said carbon dioxide vapor from said mercury manometer means, vaporizing said water solid particles to form water vapor by raising the temperature of said trap means to a temperature at least as high as the boiling point of water, and measuring the pressure of said water vapor in said mercury manometer means maintained at said constant elevated temperature.

15. A method for determining the carbon and hydrogen content of a substance comprising purifying a stream of oxygen to substantially remove all impurities therefrom, subjecting a weighed sample of said substance to pyrolysis in said stream of oxygen to form vapor products containing carbon dioxide and water, sweeping said vapor products by the continued flow of said oxygen stream into a first trap means maintained at a temperature below the freezing point of water, trapping the water as solid particles in said first trap means but permitting the remainder of said vapor products to pass to a nitrogen oxide absorber means containing manganese dioxide, reducing any nitrogen oxides in said vapor products to molecular nitrogen in said nitrogen oxides absorber means, sweeping the vapor products minus any nitrogen oxides and water into a second trap means by continued flow of said oxygen stream, trapping the vapors of carbon dioxide as solid particles in said second trap means by lowering the temperature thereof below the freezing point of carbon dioxide, stopping the flow of oxygen through the system, vaporizing the carbon dioxide solids in said second trap means by raising the temperature thereof, measuring the pressure of said carbon dioxide vapor in an evacuated mercury manometer means maintained at constant elevated temperature, recovering said carbon dioxide vapor from said mercury manometer means, vaporizing the water solids in said first trap means by raising the temperature thereof, sweeping the water vapor directly into said second trap means by the flow of oxygen, trapping the vapors of water as solid particles in said second trap means by lowering the temperature thereof below the freezing point of water, stopping the flow of oxygen through the system, vaporizing the water solids in said trap means by raising the temperature thereof, and measuring the pressure of said water vapor in an evacuated mercury manometer means maintained at constant elevated temperature.

References Cited in the file of this patent

UNITED STATES PATENTS

| | | |
|---|---|---|
| 1,498,443 | Fulsher | June 17, 1924 |
| 1,515,237 | Yensen | Nov. 11, 1924 |
| 2,429,555 | Langford | Oct. 1, 1947 |
| 2,593,015 | Dreher | Apr. 15, 1952 |
| 2,731,330 | Codell | Jan. 17, 1956 |
| 2,753,246 | Shields | July 3, 1956 |

FOREIGN PATENTS

| | | |
|---|---|---|
| 1,032,000 | Germany | June 12, 1958 |